United States Patent
Zhang et al.

(10) Patent No.: US 12,369,074 B2
(45) Date of Patent: Jul. 22, 2025

(54) DATA PACKET SENDING METHOD AND APPARATUS

(71) Applicant: Huawei Technologies Co., Ltd., Shenzhen (CN)

(72) Inventors: Menglong Zhang, Shenzhen (CN); Jie Li, Beijing (CN); Tong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 18/147,467

(22) Filed: Dec. 28, 2022

(65) Prior Publication Data

US 2023/0139633 A1    May 4, 2023

Related U.S. Application Data

(63) Continuation of application No. PCT/CN2021/080359, filed on Mar. 12, 2021.

(30) Foreign Application Priority Data

Jun. 29, 2020  (CN) .......................... 202010604021.X

(51) Int. Cl.
*H04W 28/02* (2009.01)
*H04B 5/72* (2024.01)
*H04W 28/22* (2009.01)

(52) U.S. Cl.
CPC .......... *H04W 28/0289* (2013.01); *H04B 5/72* (2024.01); *H04W 28/0278* (2013.01); *H04W 28/22* (2013.01)

(58) Field of Classification Search
None
See application file for complete search history.

(56) References Cited

U.S. PATENT DOCUMENTS

| | | | |
|---|---|---|---|
| 7,263,067 B2 * | 8/2007 | Sreemanthula | ....... H04L 1/0015 370/231 |
| 8,031,602 B2 | 10/2011 | Jiang | |

(Continued)

FOREIGN PATENT DOCUMENTS

| | | |
|---|---|---|
| CN | 106878191 A | 6/2017 |
| CN | 109120544 A | 1/2019 |
| RU | 2010133450 A | 2/2012 |

OTHER PUBLICATIONS

H. Yu, et al., "Experimental Anatomy of Packet Losses in Wireless Mesh Networks," 6th Annual IEEE Communications Society Conference on Sensor, Mesh and Ad Hoc Communications and Networks, Rome, Italy, Jun. 22-26, 2009, 9 pages.

(Continued)

*Primary Examiner* — Anh Ngoc M Nguyen
(74) *Attorney, Agent, or Firm* — Conley Rose, P.C.

(57) ABSTRACT

A method for sending a data packet includes, sending, by a transmit node, a data packet based on a target sending rate and occupation of a data sending queue, where a sending rate for sending the data packet is proportional to the target sending rate, and the occupation of the data sending queue limits a quantity of data packets. The transmit node receives a feedback message from a receive node indicating the capability of the receive node for processing the data packet. The transmit node may adjust the sending rate based on the feedback message.

20 Claims, 4 Drawing Sheets

(56) References Cited

U.S. PATENT DOCUMENTS

| | | |
|---|---|---|
| 2004/0013124 A1 | 1/2004 | Peebles et al. |
| 2007/0058651 A1 | 3/2007 | Bowen et al. |
| 2009/0180379 A1 | 7/2009 | Leung et al. |
| 2012/0079132 A1* | 3/2012 | Liu .................. H04L 47/10 709/233 |
| 2013/0155857 A1* | 6/2013 | Chrysos ............. H04L 49/90 370/235 |
| 2018/0295555 A1 | 10/2018 | Xiong et al. |
| 2023/0188230 A1 | 6/2023 | Wang et al. |

OTHER PUBLICATIONS

R1-080913, Alcatel-Lucent "Performance Comparison of Solutions for Subframe Bundling," 3GPP TSG-RAN WG1 #52, Sorrento, Italy, Feb. 11-15, 2008, 7 pages.

* cited by examiner

DATA PACKET SENDING METHOD AND APPARATUS

CROSS-REFERENCE TO RELATED APPLICATIONS

This is a continuation of International Patent Application No. PCT/CN2021/080359 filed on Mar. 12, 2021, which claims priority to Chinese Patent Application No. 202010604021.X filed on Jun. 29, 2020. The disclosures of the aforementioned applications are hereby incorporated by reference in their entireties.

TECHNICAL FIELD

Embodiments of this disclosure relate to the field of network transmission, and in particular, to a data packet sending method.

BACKGROUND

The Transmission Control Protocol (TCP)/Internet Protocol (IP) communication protocol is a connection-oriented, reliable, and byte stream-based transport layer communication protocol. The TCP implements congestion control by maintaining a congestion window. A principle of the congestion control is as follows. When a network is not congested, a congestion window value is increased to send more data packets out, and when the network is congested, the congestion window value is decreased to reduce a quantity of data packets injected into the network. A core of a congestion control algorithm is to select an effective policy to control a change of the congestion window. In the TCP congestion control, typical algorithm steps include slow startup, congestion avoidance, fast retransmission, and fast recovery. An existing congestion algorithm in the TCP implements the congestion control based on a packet loss or round-trip time (RTT) of a packet.

The packet loss feedback-based protocol is a passive congestion control mechanism. It determines whether the network is congested based on a packet loss event on a network. This protocol can improve throughput when no packet is lost. However, as the throughput increases, packet loss may inevitably occur and the throughput further decreases. Therefore, this passive congestion control may increase a network packet loss rate and cause a network jitter.

The RTT-based protocol determines whether the network is congested based on the RTT of the data packet on a network. When this protocol estimates a sending rate based on the RTT, the sending rate is unstable because an RTT jitter is large. In addition, an increasing rate of a congestion window of a data flow with a small RTT is greater than that of a data flow with a large RTT, thereby occupying more network resources and introducing RTT unfairness.

With development and popularization of a WI-FI Direct technology and a device-to-device (D2D) technology in a 5th-generation mobile communication technology (5G), a performance requirement for high-throughput transmission in a near-field communication (NFC) scenario is increasingly high, and a congestion control mechanism in an existing TCP cannot achieve optimal performance. Therefore, a data packet sending method needs to be designed, to implement high-throughput transmission performance while maintaining a low packet loss rate.

SUMMARY

This disclosure provides a data packet sending method and apparatus, applied to the field of network transmission, to resolve the problem about how to reduce a packet loss and improve throughput performance in an NFC scenario.

According to a first aspect, an embodiment of this disclosure provides a method for sending a data packet of an application, applied to a transmit node in an NFC scenario, where the application is deployed on the transmit node, and the method includes the following. The sending node sends the data packet of the application based on a target sending rate and occupation of a data sending queue, where a rate for sending the data packet of the application is proportional to the target sending rate, and the occupation of the data sending queue limits a quantity of data packets of the application that are sent in one sending period.

The sending period may be set by a system based on an empirical value. For example, the sending period may be set to 5 milliseconds (ms). It may be understood that the sending period may alternatively be set to another duration. This is not limited in this embodiment of this disclosure.

In the foregoing embodiment of this disclosure, when the transmit node sends the data packet of the application, the target sending rate and the occupation of the data sending queue are comprehensively considered, so that the data sending queue is not overloaded in a data packet sending process, thereby reducing a packet loss rate, improving data transmission efficiency, and improving throughput performance.

In a possible implementation, the transmit node receives a feedback message from a receive node, where the feedback message indicates a capability of the receive node for processing the received data packet of the application, and the transmit node adjusts, based on the feedback message, the rate for sending the data packet of the application. In this implementation, the transmit node adjusts, based on the capability of the receive node for processing the received data packet of the application, the rate for sending the data packet of the application, so that the rate of the transmit node sending the data packet of the application better matches the capability of the receive node for processing the data packet, thereby improving data transmission efficiency and throughput performance.

In a possible implementation, the capability of the receive node for processing the received data packet may be indicated by a data packet receiving rate of a data receiving queue of the receive node.

In a possible implementation, the capability of the receive node for processing the received data packet may be indicated by a packet loss state of a data receiving queue of the receive node.

In a possible implementation, the capability of the receive node for processing the received data packet may be indicated by a processing rate of an application deployed on the receive node. The processing rate indicates a quantity of data packets processed by an application per second.

In a possible implementation, the capability of the receive node for processing the received data packet may be indicated by space occupation of a processing queue of an application deployed on the receive node. It may be understood that the space occupation of the processing queue of the application may be indicated by a proportion of used space, or a space size such as a size of remaining space or a size of used space.

It may be understood that the capability of the receive node for processing the received data packet may alternatively be indicated by another parameter. This is not particularly limited in this disclosure.

In a possible implementation, adjusting the rate for sending the data packet of the application may include adjusting the target sending rate based on the capability, indicated by the feedback message, of the receive node for processing the received data packet of the application, and further adjusting, based on an adjusted target sending rate and current space occupation of the data sending queue, the rate for sending the data packet of the application.

Further, in a possible implementation, when the packet loss state of the data receiving queue of the receive node is true, the target sending rate is adjusted to a smaller value between the target sending rate and the data packet receiving rate of the data receiving queue.

In another possible implementation, when the space occupation of the processing queue of the application deployed on the receive node reaches an occupation upper limit, the target sending rate is adjusted to a smaller value between the target sending rate and the processing rate of the application deployed on the receive node.

In another possible implementation, when the packet loss state of the data receiving queue of the receive node is true, and the space occupation of the processing queue of the application deployed on the receive node reaches the occupation upper limit, the target sending rate is adjusted to a smallest value among the target sending rate, the data packet receiving rate of the data receiving queue, and the processing rate of the application deployed on the receive node.

It may be understood that the target sending rate may also be periodically adjusted based on a period set by the transmit node. Alternatively, the target sending rate may be adjusted in another manner. This is not particularly limited in this disclosure.

In a possible implementation, the feedback message is sent periodically by the receive node, and the period is preset by the system.

In another possible implementation, the feedback message is sent when the packet loss state of the data receiving queue of the receive node meets a preset condition. For example, when the packet loss state of the data receiving queue of the receive node is true, or a packet loss rate reaches a preset value, or a quantity of lost packets reaches a preset value, the receive node sends the feedback message to the transmit node.

In another possible implementation, the feedback message is sent when the space occupation of the processing queue of the application deployed on the receive node meets a preset condition.

Further, in this manner, in a possible implementation, when the space occupation of the processing queue of the application deployed on the receive node reaches the occupation upper limit, the receive node sends the feedback message to the transmit node. For example, when a used proportion Q of the processing queue of the application deployed on the receive node reaches a proportion upper limit Q1, the receive node sends the feedback message to the transmit node. The proportion upper limit Q1 may be preset by the system. For example, when the used proportion of the processing queue of the application deployed on the receive node reaches 70%, the receive node sends the feedback message to the transmit node. In another possible implementation, when the space occupation of the processing queue of the application deployed on the receive node decreases from the occupation upper limit to an occupation lower limit, the receive node sends the feedback message to the transmit node. For example, when the used proportion Q of the processing queue of the application deployed on the receive node decreases from the proportion upper limit Q1 to a proportion lower limit Q2, the receive node sends the feedback message to the transmit node. The proportion lower limit Q2 may be preset by the system. For example, when the used proportion of the processing queue of the application deployed on the receive node reaches 30%, the receive node sends the feedback message to the transmit node.

In another possible implementation, the feedback message may alternatively be sent in the following manner. When the packet loss state of the data receiving queue of the receive node is true, and the space occupation of the processing queue of the application deployed on the receive node reaches the occupation upper limit, the receive node sends the feedback message to the transmit node.

In another possible implementation, the feedback message may alternatively be sent in the following manner. When the packet loss state of the data receiving queue of the receive node is true, and the space occupation of the processing queue of the application deployed on the receive node decreases from the occupation upper limit to the occupation lower limit, the receive node sends the feedback message to the transmit node.

It may be understood that a combination of the manners of sending the feedback message may also be used. For example, when the foregoing condition is met, the feedback message is sent, or when the foregoing condition is not met, the feedback message is sent periodically. The foregoing condition includes that the packet loss state is true, the space occupation of the processing queue of the application reaches the occupation upper limit, or the space occupation of the processing queue of the application decreases from the occupation upper limit to the occupation lower limit. Alternatively, the feedback message may be sent in another case. This is not limited in this disclosure.

In a possible implementation, before the transmit node sends the data packet of the application based on the target sending rate and the space occupation of the data sending queue, the application deployed on the transmit node calculates a target quantity of sent packets in one sending period based on the target sending rate, and the application determines an actual quantity of sent packets in the sending period based on the target quantity of sent packets and remaining space of the data sending queue, where the actual quantity of sent packets is a smaller value between the target quantity of sent packets and the remaining space of the data sending queue. Then, the application sends data based on the actual quantity of sent packets. The sending period may be set by a system based on an empirical value. For example, the sending period may be set to 5 ms. It may be understood that the sending period may alternatively be set to another duration. This is not limited in this embodiment of this disclosure.

It should be noted that when the data sending queue has no remaining space, no data packet is sent in a corresponding sending period.

Before the application sends the data packet, the target sending rate and the space occupation of the data sending queue are comprehensively considered, and then an actual quantity of to-be-sent data packets is determined, so that the data sending queue is not overloaded in a data packet sending process, thereby reducing a packet loss rate in the sending process.

In a possible implementation, an initial value of the target sending rate indicates a capability of a physical layer of the transmit node for sending a data packet. For example, the target sending rate may be obtained based on physical layer information. For example, a network interface card negotiated rate is obtained based on the physical layer information, and the target sending rate is calculated based on the physical layer channel information. The physical layer channel information includes received signal strength indication (RSSI).

It may be understood that the capability of the physical layer for sending the data packet may alternatively be obtained based on the other physical layer information. This is not limited in this disclosure.

According to a second aspect, this disclosure provides a method for receiving a data packet of an application, where the method is applied to a receive node in an NFC scenario, the application is deployed on the receive node, and the method includes receiving a data packet from the transmit node, storing capability information of the receive node for processing the received data packet, where the capability information includes at least one of the following parameters: a data packet receiving rate of a data receiving queue, a packet loss state of the data receiving queue, a processing rate of the application, and space occupation of a processing queue of the application, and the receive node sends a feedback message to the transmit node, where the feedback message includes the capability information, and the feedback message indicates the transmit node to adjust a rate for sending the data packet of the application.

According to the method, the receive node sends, to the transmit node by using the feedback message, the capability information of the receive node for processing the received data packet, so that the transmit node can adjust, based on the feedback message, the rate for sending the data packet of the application, so that the rate of the transmit node for sending the data packet of the application better matches the capability of the receive node for processing the data packet, thereby improving data transmission efficiency and improving throughput performance.

In a possible implementation, the feedback message is sent periodically by the receive node, and the period is preset by a system.

In another possible implementation, the feedback message is sent when the packet loss state of the data receiving queue of the receive node meets a preset condition. For example, when the packet loss state of the data receiving queue of the receive node is true, or a packet loss rate reaches a preset value, or a quantity of lost packets reaches a preset value, the receive node sends the feedback message to the transmit node.

In another possible implementation, the feedback message is sent when the space occupation of the processing queue of the application deployed on the receive node meets a preset condition.

Further, in this manner, in a possible implementation, when the space occupation of the processing queue of the application deployed on the receive node reaches the occupation upper limit, the receive node sends the feedback message to the transmit node. For example, when a used proportion Q of the processing queue of the application deployed on the receive node reaches a proportion upper limit Q1, the receive node sends the feedback message to the transmit node. The proportion upper limit Q1 may be preset by the system. For example, when the used proportion of the processing queue of the application deployed on the receive node reaches 70%, the receive node sends the feedback message to the transmit node. In another possible implementation, when the space occupation of the processing queue of the application deployed on the receive node decreases from the occupation upper limit to an occupation lower limit, the receive node sends the feedback message to the transmit node. For example, when the used proportion Q of the processing queue of the application deployed on the receive node decreases from the proportion upper limit Q1 to a proportion lower limit Q2, the receive node sends the feedback message to the transmit node. The proportion lower limit Q1 may be preset by the system. For example, when the used proportion of the processing queue of the application deployed on the receive node reaches 30%, the receive node sends the feedback message to the transmit node.

In another possible implementation, the feedback message may alternatively be sent in the following manner. When the packet loss state of the data receiving queue of the receive node is true, and the space occupation of the processing queue of the application deployed on the receive node reaches the occupation upper limit, the receive node sends the feedback message to the transmit node.

In another possible implementation, the feedback message may alternatively be sent in the following manner. When the packet loss state of the data receiving queue of the receive node is true, and the space occupation of the processing queue of the application deployed on the receive node decreases from the occupation upper limit to the occupation lower limit, the receive node sends the feedback message to the transmit node.

It may be understood that a combination of the manners of sending the feedback message may also be used. For example, when the foregoing condition is met, the feedback message is sent, or when the foregoing condition is not met, the feedback message is sent periodically. The foregoing condition includes that the packet loss state is true, the space occupation of the processing queue of the application reaches the occupation upper limit, or the space occupation of the processing queue of the application decreases from the occupation upper limit to the occupation lower limit. Alternatively, the feedback message may be sent in another case. This is not limited in this disclosure.

According to a third aspect, an embodiment of this disclosure provides an apparatus for sending a data packet of an application. The apparatus has a function of implementing the method in any one of the first aspect or the possible implementations of the first aspect. The function may be implemented by hardware, or may be implemented by hardware executing corresponding software. The hardware or the software includes one or more modules corresponding to the function.

According to a fourth aspect, an embodiment of this disclosure provides an apparatus for receiving a data packet of an application. The apparatus has a function of implementing the method in any one of the second aspect or the possible implementations of the second aspect. The function may be implemented by hardware, or may be implemented by hardware executing corresponding software. The hardware or the software includes one or more modules corresponding to the function.

According to a fifth aspect, an embodiment of this disclosure provides a computer device, including a memory and one or more processors, where the memory is configured to store a program, and the one or more processors are configured to execute the program in the memory, so that the computer device performs the method in any one of the first aspect or the possible implementations of the first aspect of embodiments of this disclosure. The one or more processors may be coupled to the memory.

According to a sixth aspect, an embodiment of this disclosure provides a computer device, including a memory and one or more processors, where the memory is configured to store a program, and the one or more processors are configured to execute the program in the memory, so that the computer device performs the method in any one of the second aspect or the possible implementations of the second aspect of embodiments of this disclosure. The one or more processors may be coupled to the memory.

According to a seventh aspect, an embodiment of this disclosure provides a data transmission system, including the foregoing transmit node and the foregoing receive node.

According to an eighth aspect, an embodiment of this disclosure provides a computer-readable storage medium, where the computer-readable storage medium stores instructions, and when the instructions run on a computer, the computer is enabled to perform the method in any one of the first aspect or the possible implementations of the first aspect, or the computer is enabled to perform the method in any one of the second aspect or the possible implementations of the second aspect.

According to a ninth aspect, an embodiment of this disclosure provides a computer program or a computer program product. When the computer program or the computer program product is run on a computer, the computer is enabled to perform the method in any one of the first aspect or the possible implementations of the first aspect, or the computer is enabled to perform the method in any one of the second aspect or the possible implementations of the second aspect.

According to a tenth aspect, an embodiment of this disclosure provides a chip. The chip includes at least one processor and at least one interface circuit, the interface circuit is coupled to the processor, the at least one interface circuit is configured to perform a transceiver function, and send instructions to at least one processor, and the at least one processor is configured to run a computer program or the instructions. The chip has a function of implementing the method in any one of the first aspect or the possible implementations of the first aspect, or has a function of implementing the method in any one of the second aspect or the possible implementations of the second aspect. The function may be implemented by using hardware, or may be implemented by using software, or may be implemented by using a combination of hardware and software. The hardware or the software includes one or more modules corresponding to the foregoing function. In addition, the interface circuit is configured to communicate with a module other than the chip.

BRIEF DESCRIPTION OF DRAWINGS

To describe some of the technical solutions in embodiments of this disclosure more clearly, the following briefly describes the accompanying drawings for describing embodiments. It is clear that the accompanying drawings in the following description show some embodiments of this disclosure, and a person of ordinary skill in the art may still derive other drawings from these accompanying drawings without creative efforts.

DESCRIPTION OF EMBODIMENTS

The following clearly describes the technical solutions in embodiments of this disclosure with reference to the accompanying drawings in embodiments of this disclosure. It is clear that the described embodiments are some but not all of embodiments of this disclosure. All other embodiments obtained by a person of ordinary skill in the art based on embodiments of this disclosure without creative efforts shall fall within the protection scope of this disclosure.

A network architecture and a service scenario described in embodiments of the present disclosure are intended to describe technical solutions of embodiments of the present disclosure more clearly, and do not constitute a limitation on the technical solutions provided in embodiments of the present disclosure. A person of ordinary skill in the art may know with evolution of the network architecture and emergence of new service scenarios, the technical solutions provided in embodiments of the present disclosure are also applicable to similar technical problems.

In the descriptions of embodiments of this disclosure, "a plurality of" means two or more than two unless otherwise specified. In this disclosure, a term "and/or" or a character "l" describes only an association relationship between associated objects, and indicates that three relationships may exist. For example, A and/or B, or A/B may indicate the following three cases: A exists alone, both A and B exist, and B exists alone.

For ease of understanding, first, some technical terms used in this disclosure are explained as follows.

Kernel packet receiving queue is a kernel receiving queue from a receive node driven to a central processing unit (CPU) side of a protocol stack, for example, a softnet_data (per-cpu) queue in a LINUX system. The kernel packet receiving queue is one of the data receiving queues described above.

Device packet sending queue is a device sending queue from a CPU side of a protocol stack of a transmit node to a driver side, for example, a qdisc device sending queue in a LINUX system. The device packet sending queue is one of the data sending queues described above.

Application processing queue is a queue used by an application to store a data packet received from a kernel, including but not limited to a socket buffer and an application storage queue. The application processing queue is the processing queue of the application described above.

Figure 1:
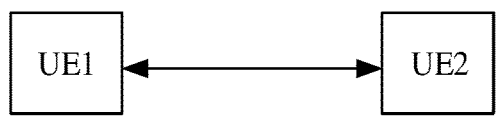
FIG. 1 is a schematic diagram of a typical application scenario according to an embodiment of this disclosure.

A typical scenario in this disclosure is a scenario in which a throughput performance bottleneck lies in an end node, for example, peer-to-peer (P2P) or D2D in an NFC scenario. D2D may support short-distance point-to-point or point-to-multipoint communication between two or more devices. Typical D2D devices include BLUETOOTH, WI-FI-Direct, and the like. FIG. 1 is a schematic diagram of a typical application scenario according to an embodiment of this disclosure. A user equipment (UE) 1 performs data transmission with UE 2 based on a transmission protocol, for example, mobile phone cloning, or file, picture, or video transmission. Data may be transmitted between UEs over a wired or wireless link. Due to factors such as the link, a data packet may also be lost. Therefore, to ensure reliable data transmission, the TCP becomes a first choice in transport protocols between different devices. However, a window-based mechanism such as a transmission mechanism, a congestion control mechanism, or a timeout retransmission mechanism introduced in the TCP to ensure reliable data transmission imposes a very large limitation on a data transmission rate, and reduces link utilization. This disclosure intends to design a data packet sending method for the scenario in which the throughput performance bottleneck lies in the end node, to implement high-throughput transmission performance while maintaining a low packet loss rate. It may be understood that the technical solutions provided in embodiments of the present disclosure are applicable to all communication systems based on a TCP/IP reference model. The TCP/IP reference model is an abstract hierarchical model. Usually, the TCP/IP reference model is also referred to as a TCP/IP protocol stack. In this model, all network protocols are classified into five abstract "layers": a physical layer, a link layer, a network layer, a transport layer, and an application layer. A definition of each layer is the same as that in the conventional technology, and is not described in embodiments of the present disclosure.

It may be understood that this disclosure may also be applied to a data transmission system in which a packet loss rarely occurs or no packet loss occurs on a network, and an intermediate device on the network does not become a bottleneck.

It may be understood that this disclosure may be executed by an operating system, a kernel, or an application.

The user equipment UE in this disclosure may include a handheld device, a vehicle-mounted device, a wearable device, and a computing device that have a communication function, and UE, a mobile station (MS), a terminal, and terminal equipment in various forms, such as a personal computer (PC), a smartphone, a laptop computer, a tablet computer, and a digital camera (DC).

Figure 2:
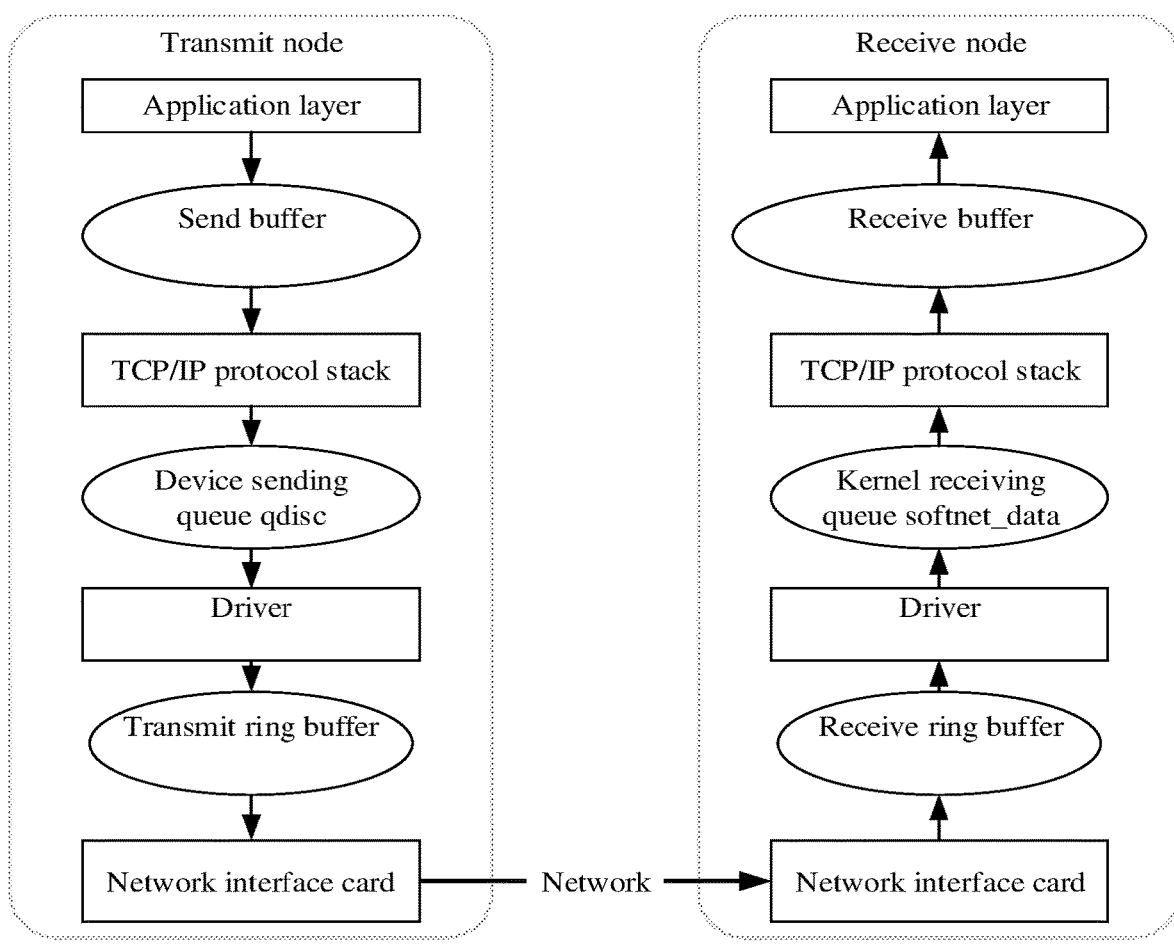
FIG. 2 is a schematic diagram of a protocol stack and a cache at each layer during data sending and receiving according to an embodiment of this disclosure.

FIG. 2 is a schematic diagram of a protocol stack and a cache at each layer during data sending and receiving.

A transmit node and a receive node may be standalone physical devices or may be virtual machines. In a scenario, the transmit node may be user equipment, and the receive node may be a server. In another scenario, roles of the user equipment and the server may be interchanged. That is, the server serves as the transmit node, and the user equipment serves as the receive node. It may be understood that both the transmit node and the receive node may be user equipment or servers, and this is not limited in the present disclosure.

A public network, a private network, the internet, a part of a local area network, and/or any combination thereof may be included between the transmit node and the receive node. In addition, it should be further noted that in this embodiment of the present disclosure, data packet sending on the transmit node and the receive node is mainly optimized, to reduce a packet loss rate and improve a data transmission rate, regardless of a type of the network between the transmit node and the receive node. FIG. 2 does not show the network between the transmit node and the receive node. It may be understood that the method provided in this embodiment of the present disclosure may be used in a scenario in which data is transmitted between different devices by using a wired or wireless network. For example, data is transmitted between different UEs through a wireless network (for example, a WI-FI network or a cellular network), or data is transmitted between servers in a wired or wireless manner.

The transmit node and the receive node each include a protocol stack. The application can transmit data based on the protocol stack. Functions of the protocol stack may be executed by an appropriate combination of software, hardware, and/or firmware. In addition, a person skilled in the art may understand that the transmit node and the receive node may include more or fewer components than the components shown in FIG. 2, and FIG. 2 shows only the components more related to a plurality of implementations disclosed in this embodiment of the present disclosure.

The following describes some protocol stacks and buffers in the transmit node and the receive node.

Application layer: provides a service for a users' application process.

Socket buffer: each TCP socket has a send buffer (or send socket buffer) and a receive buffer (or receive socket buffer) in a kernel. The send buffer copies data in an application buffer to a transmit socket buffer. At proper time, the kernel sends the data in the transmit socket buffer to a receive socket buffer of a receiver. The receive buffer is used to cache data. When an application invokes a read function, the receive buffer copies data from a receive socket buffer of a receiver to an application buffer. If the application does not invoke the read function, the data is always cached in the corresponding receive socket buffer.

TCP/IP protocol stack: defines some protocols and port numbers for data transmission, and provides connections and path selection between two host systems on networks in different geographical locations. A processing process of sending and receiving the data packet is implemented in the TCP/IP protocol stack of the kernel.

Device sending queue is a data sending queue from a CPU side of the TCP/IP protocol stack of the transmit node to a driver side, for example, a queue discipline (qdisc) device sending queue in a LINUX system.

Driver/NIC defines physical device standards, such as an interface type of a network cable, an interface type of an optical fiber, and transmission rates of various transmission media.

Ring Buffer (Ring Buf) is often used as a data structure to store data sent and received during communication in a communication program. The ring buffer is a first-in-first-out circular buffer that can provide mutually exclusive access to a buffer to the communication program. In this embodiment of this disclosure, a transmit ring buffer (TX Ring Buf) and a receive ring buffer (RX Ring Buf) are related. The TX Ring Buf is used to copy a data packet from a memory to a buffer on a network interface card in a Direct Memory Access (DMA) manner, and the RX Ring Buf is used to copy a data packet from a buffer on a network interface card to a memory in a DMA manner.

Kernel receiving queue is a data receiving queue from the receive node driven to a CPU side of the TCP/IP protocol stack, for example, a softnet_data(per-cpu) queue in a LINUX system.

In a data sending process, the application creates data and copies the data to the transmit socket buffer. If no memory is available in the buffer, the system fails to be invoked or is blocked. Therefore, a data flowing rate from the application to the kernel is limited by a size of the socket buffer.

The TCP protocol stack creates and sends a data packet, and sends the data packet to a network interface card (NIC) driver by using a data sending queue qdisc.

The TX Ring Buf is located between the NIC driver and the NIC. The TX ring buffer can be considered as a sending request queue. If the TX ring buffer is full, the NIC driver cannot send a sending request. In this case, to-be-sent data packets are accumulated in the qdisc between the TCP/IP protocol stack and the NIC driver. If the accumulated data packets exceed a volume of the qdisc, a newly-sent data packet may be directly discarded.

The NIC stores the to-be-sent data packets in its own buffer, and a rate for sending the data packets is mainly determined by a physical speed of the NIC.

In a data receiving process, the data packet received by the receive node is sent by the NIC to an upper layer. The RX ring buffer between the NIC and the NIC driver may be used as a buffer. The NIC driver fetches a request of the received data packet from the RX ring buffer and sends the request to the upper layer. The driver may put the data packet in a data receiving queue of the kernel, so that the kernel system can fetch the data packet. Data of the network packet is uploaded and cached in the receive socket buffer, and then the application reads the data from the receive socket buffer into the application buffer, and then processes the data packet.

It should be noted that, when the application itself may not have a buffer, the application directly reads the data from the receive socket buffer, and then processes the data packet. In this case, a processing queue of the application is the receive socket buffer. This scenario is not shown in FIG. 2, but is also a possible scenario in data packet transmission.

Figure 3:
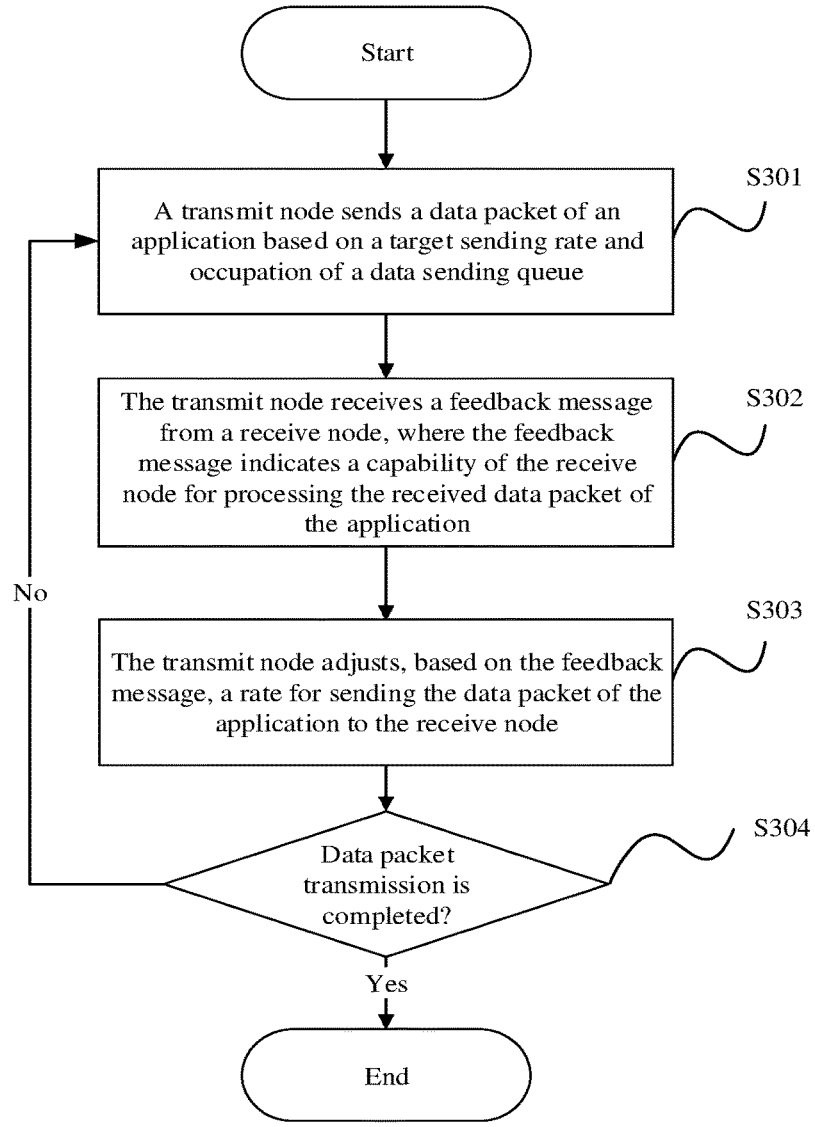
FIG. 3 is a schematic flowchart of a method for sending a data packet of an application according to an embodiment of this disclosure.

Based on the foregoing protocol stack and the cache principle at each layer, the following describes a method for sending a data packet of an application according to an embodiment of this disclosure. As shown in FIG. 3, the method mainly includes the following steps.

Step S301: A transmit node sends the data packet of the application based on a target sending rate and occupation of a data sending queue.

Step S302: The transmit node receives a feedback message from a receive node, where the feedback message indicates a capability of the receive node for processing the received data packet of the application.

Step S303: The transmit node adjusts, based on the feedback message, a rate for sending the data packet of the application.

Step S304: Determine whether transmission of the data packet is completed.

If yes, end this process.

If no, continue step S301.

For example, in the method for sending the data packet of the application in this embodiment of this disclosure, the target sending rate, the occupation of the data sending queue, and the capability of the receive node for processing the received data packet of the application are comprehensively considered to actively adjust the rate for sending the data packet of the application, so that the data sending queue is not overloaded in a data packet sending process, thereby reducing a packet loss rate. In this way, the rate of the transmit node for sending the data packet of the application better matches the capability of the receive node for processing the data packet, thereby improving data transmission efficiency and throughput performance.

It may be understood that, in an application process of this embodiment of this disclosure, the rate for sending the data packet of the application may be adjusted based on only the target sending rate and the occupation of the data sending queue. The receive node may send the feedback message, or may not send the feedback message.

The following describes a detailed procedure of sending and receiving a data packet of an application in this embodiment of this disclosure by using a specific example.

For step S301, the transmit node sends the data packet of the application based on the target sending rate and the occupation of the data sending queue.

First, the transmit node obtains a network interface card negotiated rate $V_{nego}$ from a network interface card.

It should be noted that the network interface card negotiated rate changes with a network status, and the obtained rate herein is a rate corresponding to an obtained moment.

Then, the transmit node calculates a target sending rate V: $V = V_{nego}/8*p$.

p is a proportional coefficient calculated based on physical layer channel information such as RSSI, the RSSI is a received signal strength indicator, is an optional part of a wireless sending layer, and is used to determine link quality and determine whether to increase broadcast sending strength. The RSSI is information obtained from the network interface card. In an example, a value of a correspondence between the RSSI and p may be shown in Table 1. When the RSSI is greater than (−50 decibels (dB)), a value of p may be 1. When the RSSI is less than (−50 dB) and the RSSI is greater than (−60 dB), a value of p may be 0.9.

TABLE 1

| RSSI > −50 dB | p = 1.0 |
| RSSI < −50 dB && RSSI > −60 dB | p = 0.9 |
| RSSI < −60 dB && RSSI > −70 dB | p = 0.8 |
| RSSI < −70 dB | p = 0.7 |

It may be understood that the value relationship between the RSSI and the proportional coefficient p may alternatively be another correspondence. This is not limited in this embodiment of this disclosure.

Then, the transmit node calculates a target quantity of sent packets based on a target sending rate V and a sending period T.

The target quantity of sent packets $S = V*T$.

The sending period is set by a system based on an empirical value. For example, the sending period T may be set to 5 ms, or may be set to another duration. This is not limited in this embodiment of this disclosure.

The sending period T may be set in a process of sending the data packet, which is a common manner of actively limiting the sending rate. Alternatively, the sending rate may be actively limited in another manner. This is not limited in this disclosure.

In addition, the transmit node obtains the occupation of the data sending queue. In this embodiment, a qdisc device packet sending queue is used as an example. It is assumed that a total length is N, and a remaining space length is $N_c$.

Then, an actual quantity of sent packets is calculated.

The actual quantity of sent packets can be calculated as follows: $N_{tx} = \min(S, N_c*r)$. In an example, a value of a proportional coefficient r is recommended to be 0.95. The proportional coefficient r is a protection mechanism, to protect the device packet sending queue from being overloaded to send the data packet, and prevent a packet loss of a data receiving queue. It may be understood that r may alternatively be set to another value. This is not limited in this embodiment of this disclosure.

Finally, when sending of data packets in $N_{tx}$ is completed, sleep time is calculated, and then data packet sending in a next period is performed.

Figure 4:
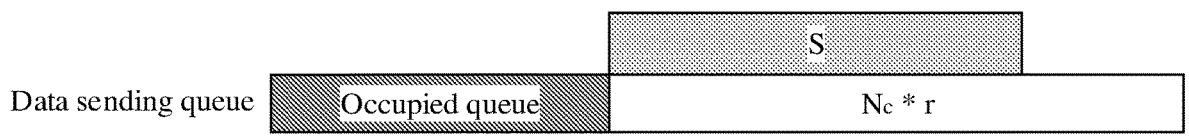
FIG. 4 is a schematic diagram of a quantity of target sent packets that is less than remaining space of a device packet sending queue according to an embodiment of this disclosure.

The following describes a manner of calculating the sleep time by using two examples. Based on usage of the device packet sending queue, there are two cases:

When $S<N_c*r$, that is, a target quantity of sent packets in the sending period T is less than remaining space of the device packet sending queue, as shown in FIG. 4. In this case, the sleep time is $T_2=T-T_1$. T is a sending period set by the system, $T_1$ is time consumed for sending the $N_{tx}$ data packets, and $T_1$ may be calculated based on system time. For example, if time a is obtained before the data packet is sent, and time b is obtained after the data packet is sent, $T_1=b-a$. It may be understood that this calculation manner is merely an example, or may be calculated in another manner. This is not limited in this embodiment of this disclosure.

After the sleep time expires, data packet transmission in the current period T is stopped, and the data packet continues to be sent in a next sending period.

Figure 5:
FIG. 5 is a schematic diagram of a quantity of target sent packets that is greater than or equal to remaining space of a device packet sending queue according to an embodiment of this disclosure.

When $S≥N_c*r$, that is, the target quantity of sent packets in the sending period T is greater than or equal to the remaining space of the device packet sending queue, as shown in FIG. 5, the case is as follows:

(1) Calculate time $T_1$ consumed for sending the $N_{tx}$ data packets: $T_1$ may be calculated based on the system time. For example, if time a is obtained before the data packet is sent, and time b is obtained after the data packet is sent, $T_1=b-a$. After sending of the $N_{tx}$ data packets is completed, the device packet sending queue continues to be full.

(2) Calculate waiting time $T_3$ after data of a specific proportion of a queue length is sent: for example, time consumed for waiting a queue to send data of a queue length (N*q), where q is a proportion coefficient of to-be-sent data packets of the device packet sending queue, and q is recommended to be set to ½, that is, the data packet continues to be sent after data of a half of the total length N of the device packet sending queue is sent.

The proportional coefficient is set to prevent resource waste caused by that the qdisc device packet sending queue is idle but cannot send the packet because the queue is still in the sleep state. It may be understood that q may alternatively be set to another value. This is not limited in this embodiment of this disclosure.

(3) Calculate sleep time: select the sleep time as min($T_2$, $T_3$), where $T_2=T-T_1$ and $T_3=N*q/V$.

(4) After the sleep time expires, data packet transmission in the current period T is stopped, and the data packet continues to be sent in a next sending period.

The sleep time is properly set to control a quantity of sent packets, so that the device packet sending queue is not overloaded, thereby reducing a packet loss rate in the sending process, and further to prevent resource waste caused by that the packet sending queue is idle but cannot send the data packet because the queue is still in the sleep state.

For step S302, the transmit node receives the feedback message from the receive node, where the feedback message indicates the capability of the receive node for processing the received data packet of the application.

First, the receive node monitors dynamic changes of a kernel packet receiving queue and an application processing queue, and feeds back a receiving status.

The receive node calculates a data packet receiving rate $V_{nr}$ based on a quantity of received packets of the kernel packet receiving queue per unit time. The calculation method is as follows:

At a moment $T_1$, a total quantity $S_1$ of received packets of the kernel packet receiving queue is recorded.

At a moment $T_2$, a total quantity $S_2$ of received packets of the kernel packet receiving queue is recorded.

A receiving rate $V_{nr}=(S_2-S_1)/(T_2-T_1)$ of the kernel packet receiving queue is calculated. An interval between $T_2$ and $T_1$ may be set to 200 ms. It may be understood that the interval between $T_2$ and $T_1$ may also be set to another value. This is not limited in this embodiment of this disclosure. It may be understood that the data packet receiving rate may also be calculated in another manner. This is not limited in this embodiment of this disclosure.

Then, a packet loss state $S_{drop}$ is recorded based on packet loss data of the kernel packet receiving queue. The packet loss state $S_{drop}$ can be calculated as follows:

At a moment $T_1$, a total quantity $D_1$ of lost packets of the kernel packet receiving queue is recorded.

At a moment $T_2$, a total quantity $D_2$ of lost packets of the kernel packet receiving queue is recorded.

A quantity of lost packets in the kernel packet receiving queue is calculated as follows: $D=(D_2-D_1)$. An interval between $T_2$ and $T_1$ may be set to 200 ms. It may be understood that the interval between $T_2$ and $T_1$ may also be set to another value. This is not limited in this embodiment of this disclosure.

If $D>0$, $S_{drop}$=true, otherwise, $S_{drop}$=false.

It may be understood that setting of the packet loss state may also be that when D reaches a value preset by the system, the packet loss state is set to $S_{drop}$=true, otherwise, $S_{drop}$=false. The packet loss state may also be determined based on a packet loss rate. For example, when the packet loss rate reaches a value preset by the system, the packet loss state is set to $S_{drop}$=true, otherwise, $S_{drop}$=false. A criterion for setting the packet loss state is not limited in this embodiment of this disclosure.

Then, a processing rate $V_{ap}$ of the application, that is, a quantity of data packets processed by an application in a unit time is calculated. The application may be used to collect a quantity of processed data packets and time used for processing these data packets, and then calculate $V_{ap}$ based on the quantity/time. It may be understood that the processing rate of the application may also be calculated in another manner. This is not limited in this embodiment of this disclosure.

Then, used proportion information Q of the application processing queue is recorded.

Figure 6:
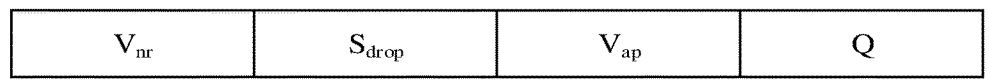
FIG. 6 is a schematic diagram of content of a feedback message according to an embodiment of this disclosure.

Finally, the receive node sends the feedback message to the transmit node. The feedback message may include information such as $V_{nr}$ and $S_{drop}$ that are recorded in the kernel packet receiving queue, and $V_{ap}$ and/or Q that are/is recorded in the application processing queue. An example of the feedback message is shown in FIG. 6. It may be understood that the feedback message in this embodiment of this disclosure is not limited to the content and the format shown in FIG. 6, and may further include various formats and protocol content notified by the receive node to the transmit node.

The feedback message may be sent in the following manners:

(1) The receive node periodically sends the feedback message to the transmit node.

A period of sending the feedback message may be set to 200 ms. It may be understood that the period of sending the feedback message may also be set to another value. This is not limited in this embodiment of this disclosure.

(2) When detecting $S_{drop}$=true, the receive node sends the feedback message to the transmit node.

(3) When detecting that the used proportion Q of the application processing queue increases to Q1 or Q decreases from Q1 to Q2, the receive node sends the feedback message to the transmit node.

Q1 and Q2 represent used proportions of the application processing queue, and Q1 and Q2 are set based on empirical values during system initialization. For example, a value of Q1 may be 70%, and a value of Q2 may be 30%. That is, when 70% of the application processing queue is used, the receive node sends the feedback message to the transmit node, or after the used proportion of the application processing queue decreases from 70% to 30%, the receive node sends the feedback message to the transmit node.

(4) When a packet loss state of a data receiving queue of the receive node is true, and space occupation of a processing queue of the application deployed on the receive node reaches an occupation upper limit, the receive node sends the feedback message to the transmit node.

(5) When the packet loss state of the data receiving queue of the receive node is true, and the space occupation of the processing queue of the application deployed on the receive node decreases from the occupation upper limit to an occupation lower limit, the receive node sends the feedback message to the transmit node.

It may be understood that the foregoing manner of sending the feedback message is merely an example, and the feedback message may alternatively be sent in another case. This is not limited in this embodiment of this disclosure.

For step S303, the transmit node adjusts, based on the feedback message, the rate for sending the data packet of the application.

First, the transmit node adjusts the target sending rate based on the capability, indicated by the feedback message, of the receiving node for processing the received data packet of the application.

(1) The transmit node determines a target sending rate $V_{new}=V_{nego}'/8*p'$ based on physical layer channel information. Herein, $V_{nego}'$ is different from $V_{nego}$ in step S301, and is a network interface card negotiated rate when the feedback message is received. $p'$ is a proportional coefficient corresponding to the physical layer channel information such as RSSI at the moment.

It should be noted that the transmit node may determine the target sending rate based on physical layer information at a moment of receiving the feedback message, or the transmit node may periodically adjust the target sending rate, for example, periodically calculate the target sending rate based on the network interface card negotiated rate and the RSSI at the physical layer.

(2) When it is detected that the packet loss $S_{drop}$=true occurs on the receive node, the target sending rate is adjusted to $V_{new}=\min(V_{new}, V_{nr})$, or when Q increases to Q1, the target sending rate is adjusted to $V_{new}=\min(V_{new}, V_{ap})$.

Q1 indicates the used proportion of the application processing queue. For example, when a proportion of the queue reaches Q1 (for example, 70%), flow control needs to be enabled to send the packet at the application processing rate $V_{ap}$. When a proportion of the queue decreases to Q2 (for example, 30%), the target sending rate is not affected by the application processing rate.

It may be understood that values of Q1 and Q2 herein are merely examples, and may also be set to other values in an actual application process. In the actual application process, the space occupation of the application processing queue may also be determined by using a space size such as a size of used space or a size of remaining space, to adjust the target sending rate.

The foregoing describes in detail the method for sending and receiving the data packet of the application provided in this embodiment of this disclosure.

In this embodiment of this disclosure, when the transmit node sends the data packet of the application, the target sending rate and the occupation of the data sending queue are comprehensively considered, so that the data sending queue is not overloaded in a data packet sending process, thereby reducing a packet loss rate. In addition, the transmit node adjusts, based on the capability of the receive node for processing the received data packet of the application, the rate for sending the data packet of the application, so that the rate of the transmit node for sending the data packet of the application better matches the capability of the receive node for processing the data packet, thereby improving data transmission efficiency and throughput performance.

Figure 7:
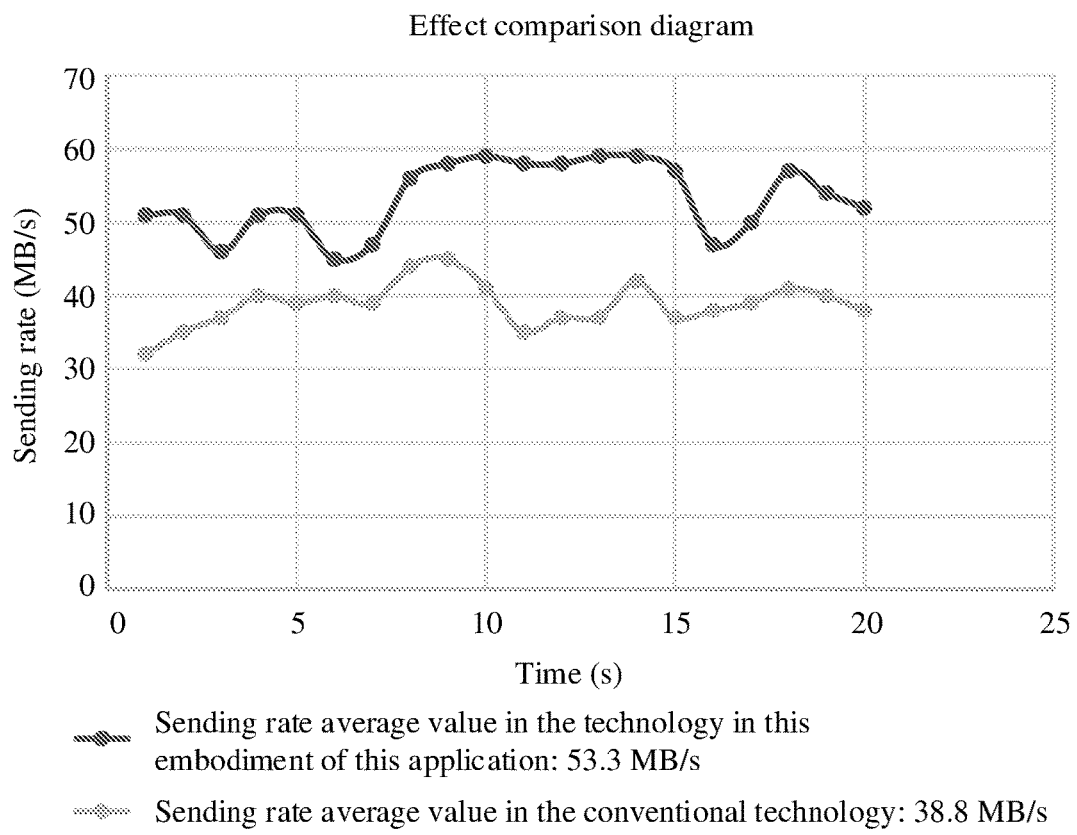
FIG. 7 is an application effect diagram according to an embodiment of this disclosure.

FIG. 7 is a comparison diagram of effects of sending a data packet of an application by using bottleneck bandwidth and RTT (BBR) of a TCP congestion control algorithm and sending a data packet of an application by using the method for sending the data packet of the application according to this embodiment of this disclosure on a same terminal. The comparison solutions are as follows.

Before the Optimization:

In terms of obtaining the sending rate, the existing TCP congestion control algorithm BBR controls data packet sending based on an RTT round-trip delay, which easily causes a large jitter of the sending rate, and link sending performance cannot be fully utilized.

In terms of calculating the quantity of sent packets, in the existing BBR technology, only a delay of an intermediate node in network transmission is considered when the data packet is sent, and space occupation of a buffer queue at each layer on a terminal such as a mobile phone is not considered, and therefore a queue packet loss easily occurs.

After the Optimization:

In the NFC scenario, the capability of the physical layer of the transmit node for sending the data packet, the data packet receiving rate of the data receiving queue of the receive node, the packet loss state of the data receiving queue of the receive node, the processing rate of the application deployed on the receive node, or the space occupation of the processing queue of the application deployed on the receive node may be comprehensively considered to adjust the target sending rate, and further the rate for sending the data packet of the application is adjusted based on an adjusted target sending rate and current space occupation of the data sending queue, thereby reducing packet loss of the buffer queue at each layer of the terminal, and implementing network transmission performance maximization.

In terms of the sending rate, FIG. 7 provides an effect comparison between sending the data packet of the application by using the TCP congestion control algorithm BBR and sending the data packet of the application by using the method for sending the data packet of the application provided in this embodiment of this disclosure. When the existing BBR technology is used, an average sending rate is 38.8 megabytes per second (MB/s). When the solution provided in this embodiment of this disclosure is used, an average sending rate is 53.3 MB/s. It can be learned that the technology for sending the data packet of the application in this embodiment of this disclosure can improve the data sending rate.

The foregoing mainly describes a specific procedure of the method provided in embodiments of this disclosure. The following describes apparatus embodiments of this disclosure.

Figure 8:
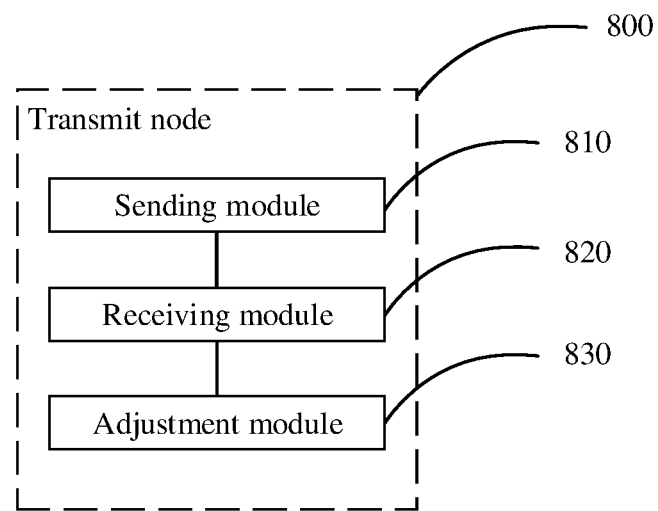
FIG. 8 is a schematic diagram of a logical structure of an apparatus for sending a data packet of an application according to this disclosure.

FIG. 8 is a schematic diagram of a logical structure of an apparatus 800 for sending a data packet of an application according to this disclosure. For example, as shown in the figure, the apparatus 800 for sending the data packet of the application includes a sending module 810, a receiving module 820, and an adjustment module 830.

The sending module 810 is configured to send the data packet of the application based on a target sending rate and occupation of a data sending queue, where a rate for sending the data packet of the application is proportional to the target sending rate, and the occupation of the data sending queue limits a quantity of data packets of the application. The sending module is further configured to calculate a target quantity of sent packets in one sending period based on the target sending rate, determine an actual quantity of sent packets in the sending period based on the target quantity of sent packets and remaining space of the data sending queue, and send the data packet based on the actual quantity of sent packets.

The receiving module 820 is configured to receive a feedback message from a receive node, where the feedback message indicates a capability of the receive node for processing the received data packet of the application, and the capability of the receive node for processing the received data packet is indicated by at least one of the following parameters a data packet receiving rate of a data receiving queue of the receive node, a packet loss state of the data receiving queue of the receive node, a processing rate of the application deployed on the receive node, and space occupation of a processing queue of the application deployed on the receive node, where the data receiving queue is used to receive a data packet from a device driver layer. A manner of sending the feedback message is at least one of the following manners: periodical sending, sending when a packet loss state of a data receiving queue of the receive node meets a preset condition, and sending when space occupation of a processing queue of the application deployed on the receive node meets a preset condition.

The adjustment module 830 is configured to adjust, based on the feedback message, the rate for sending the data packet of the application.

The adjustment module 830 is further configured to adjust the target sending rate based on the capability, indicated by the feedback message, of the receive node for processing the received data packet of the application, and further adjust, based on an adjusted target sending rate and current space occupation of the data sending queue, the rate for sending the data packet of the application.

The adjustment module 830 is further configured to, when a packet loss state of a data receiving queue of the receive node is true, adjust the target sending rate to a smaller value between the target sending rate and a data packet receiving rate of the data receiving queue, when space occupation of a processing queue of the application deployed on the receive node reaches an occupation upper limit, adjust the target sending rate to a smaller value between the target sending rate and a processing rate of the application deployed on the receive node, and when the packet loss state of the data receiving queue of the receive node is true, and the space occupation of the processing queue of the application deployed on the receive node reaches the occupation upper limit, adjust the target sending rate to a smallest value among the target sending rate, the data packet receiving rate of the data receiving queue, and the processing rate of the application deployed on the receive node.

It may be understood that the apparatus 800 for sending the data packet of the application provided in this embodiment of this disclosure may alternatively include only the sending module. In this embodiment of this disclosure, a scenario in which the receive node sends the feedback message is considered. Therefore, the receiving module and the adjustment module are further included. In a scenario in which the receive node does not send the feedback message, the apparatus includes only the sending module.

For an effect of the apparatus 800 for sending the data packet of the application provided in this embodiment of this disclosure, refer to the foregoing method embodiments. Details are not described herein again.

Figure 9:
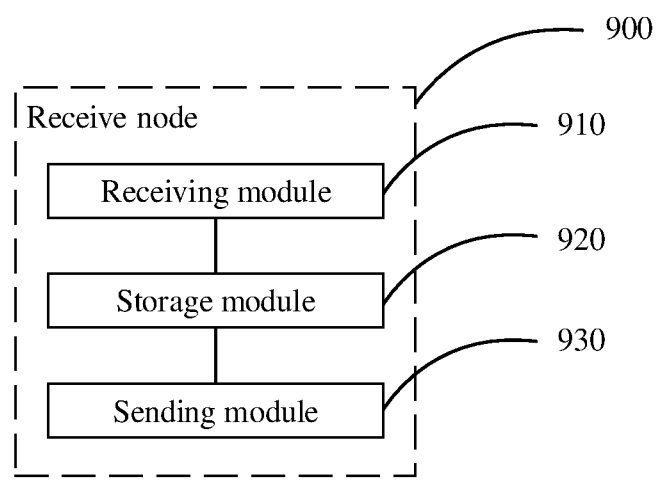
FIG. 9 is a schematic diagram of a logical structure of an apparatus for receiving a data packet of an application according to this disclosure.

FIG. 9 is a schematic diagram of a logical structure of an apparatus 900 for receiving a data packet of an application according to this disclosure. As shown in the figure, the apparatus 900 for sending the data packet of the application includes a receiving module 910, a storage module 920, and a sending module 930.

The receiving module 910 is configured to receive a data packet from a transmit node.

The storage module 920 is configured to store capability information when the data packet is received, where the capability information includes at least one of the following parameters: a data packet receiving rate of a data receiving queue, a packet loss state of the data receiving queue, a processing rate of the application, and space occupation of a processing queue of the application.

The sending module 930 is configured to send a feedback message to the transmit node, where the feedback message includes the capability information, and the feedback message indicates the transmit node to adjust a rate for sending the data packet of the application. A manner of sending the feedback message is at least one of the following manners: periodical sending, sending when the packet loss state of the data receiving queue meets a preset condition, and sending when the space occupation of the processing queue of the application meets a preset condition.

In addition, this disclosure further provides a storage medium, a computer program product, computer programs, and the like related to the solution provided in this disclosure. For specific implementation, refer to the foregoing embodiment.

A person of ordinary skill in the art may be aware that all or some of the modules and algorithm steps in the examples described in the foregoing embodiments may be implemented by using software, hardware, firmware, or any combination thereof. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

When software is used to implement embodiments, all or some of embodiments may be implemented in a form of a computer program product. The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state disk (SSD)), or the like.

The described apparatus embodiments are merely examples. For example, the module division is merely logical function division. The units described as separate parts may or may not be physically separate. Some or all the modules may be selected according to actual needs to achieve the objectives of the solutions of embodiments. In addition, in the accompanying drawings of the apparatus embodiments provided in this disclosure, modules may communicate with each other through one or more communication buses or signal cables. A person of ordinary skill in the art may understand and implement embodiments of the present disclosure without creative efforts.

The foregoing descriptions are merely some specific embodiments of this disclosure, but the protection scope of this disclosure is not limited thereto.

What is claimed is:

1. A method for sending a data packet of an application, wherein the method is applied to a near-field communication (NFC) scenario, wherein the method is implemented by a transmit node, and wherein the method comprises:
    deploying the application on the transmit node; and
    sending, based on a target sending rate and occupation of a data sending queue, the data packet,
    wherein a sending rate for sending the data packet is proportional to the target sending rate, and
    wherein the occupation of the data sending queue limits a quantity of data packets sent in one sending period.

2. The method of claim 1, further comprising:
    receiving, from a receive node, a feedback message indicating a capability of the receive node for processing the data packet; and
    adjusting, based on the feedback message, the sending rate.

3. The method of claim 2, further comprising receiving a parameter indicating the capability of the receive node for processing the received data packet, wherein the parameter comprises one or more of:
    a data packet receiving rate of a data receiving queue of the receive node, wherein the data receiving queue receives the data packet from a device driver layer;
    a packet loss state of the data receiving queue;
    a processing rate of the application deployed on the receive node; or
    space occupation of a processing queue of the application deployed on the receive node.

4. The method of claim 2, further comprising:
    periodically receiving the feedback message;
    receiving the feedback message when a packet loss state of a data receiving queue of the receive node meets a preset condition; or
    receiving the feedback message when space occupation of a processing queue of the application deployed on the receive node meets the preset condition.

5. The method of claim 2, further comprising:
    adjusting, based on the capability of the receive node for processing the received data packet, the target sending rate to obtain an adjusted target sending rate; and
    further adjusting, based on the adjusted target sending rate and current space occupation of the data sending queue, the sending rate.

6. The method of claim 5, wherein the adjusting the target sending rate comprises:
    adjusting the target sending rate to a minimum value between the target sending rate and a data packet receiving rate of a data receiving queue of the receive node when a packet loss state of the data receiving queue is true;
    adjusting the target sending rate to a minimum value between the target sending rate and a processing rate of the application deployed on the receive node when space occupation of a processing queue of the application deployed on the receive node reaches an occupation upper limit; and
    adjusting the target sending rate to a minimum value among the target sending rate, the data packet receiving rate, and the processing rate when the packet loss state is true and when the space occupation reaches the occupation upper limit.

7. The method of claim 1, further comprising:
    calculating a target quantity of sent packets in the one sending period based on the target sending rate;
    determining an actual quantity of sent packets in the one sending period based on the target quantity of sent packets and remaining space of the data sending queue, wherein the actual quantity of sent packets is a minimum value between the target quantity of sent packets and the remaining space of the data sending queue; or
    sending the data packet based on the actual quantity of sent packets.

8. The method of claim 1, wherein an initial value of the target sending rate indicates a specified capability of a physical layer of the transmit node for sending the data packet.

9. A computer program product comprising computer-executable instructions that are stored on a non-transitory computer-readable storage medium and that, when executed by a processor, cause a transmit node to:
    deploy an application on the transmit node; and
    send, based on a target sending rate and occupation of a data sending queue, a data packet of the application,
    wherein a sending rate for sending the data packet is proportional to the target sending rate, and
    wherein the occupation limits a quantity of data packets sent in one sending period.

10. The computer program product of claim 9, wherein the computer-executable instructions further cause the transmit node to:
    receive, from a receive node, a feedback message indicating a capability of the receive node for processing the data packet; and
    adjust, based on the feedback message, the sending rate.

11. The computer program product of claim 10, wherein the capability of the receive node for processing the received data packet is indicated to the transmit node by at least one of the following parameters:
    a data packet receiving rate of a data receiving queue of the receive node, wherein the data receiving queue receives the data packet from a device driver layer;
    a packet loss state of the data receiving queue of the receive node;

a processing rate of the application deployed on the receive node; or space occupation of a processing queue of the application deployed on the receive node.

12. The computer program product of claim 10, wherein the computer-executable instructions further cause the transmit node to:

adjust, based on the capability, of the receive node for processing the received data packet the target sending rate to obtain an adjusted target sending rate; and further adjust, based on the adjusted target sending rate and current space occupation of the data sending queue, the sending rate.

13. The computer program product of claim 12, wherein the computer-executable instructions further cause the transmit node to:

periodically receive the feedback message;

receive the feedback message when a packet loss state of a data receiving queue of the receive node meets a preset condition; or receive the feedback message when space occupation of a processing queue of the application deployed on the receive node meets the preset condition.

14. The computer program product of claim 12, wherein the computer-executable instructions further cause the transmit node to:

further adjust the target sending rate to a minimum value between the target sending rate and a data packet receiving rate of a data receiving queue of the receive node when a packet loss state of the data receiving queue is true;

further adjust the target sending rate to a minimum value between the target sending rate and a processing rate of the application deployed on the receive node when space occupation of a processing queue of the application deployed on the receive node reaches an occupation upper limit; and further adjust the target sending rate to a minimum value among the target sending rate, the data packet receiving rate, and the processing rate when the packet loss state is true and when the space occupation reaches the occupation upper limit.

15. The computer program product of claim 9, wherein the computer-executable instructions further cause the transmit node to:

calculate a target quantity of sent packets in the one sending period based on the target sending rate;

determine, based on the target quantity of sent packets and remaining space of the data sending queue, an actual quantity of sent packets in the one sending period, wherein the actual quantity of sent packets is a minimum value between the target quantity of sent packets and the remaining space of the data sending queue; and send, based on the actual quantity of sent packets, the data packet.

16. The computer program product of claim 9, wherein an initial value of the target sending rate indicates a specified capability of a physical layer of the transmit node for sending the data packet.

17. A transmit node for sending a data packet of an application, wherein the transmit node comprises:

a memory configured to store instructions; and a processor coupled to the memory and configured to execute the instructions to cause the transmit node to:

deploy the application on the transmit node; and send, based on a target sending rate and occupation of a data sending queue, the data packet, wherein a sending rate for sending the data packet is proportional to the target sending rate, and wherein the occupation of the data sending queue limits a quantity of data packets sent in one sending period.

18. The transmit node of claim 17, wherein the processor is further configured to execute the instructions to cause the transmit node to:

receive, from a receive node, a feedback message indicating a capability of the receive node for processing the data packet; and adjust, based on the feedback message, the sending rate.

19. The transmit node of claim 18, wherein the capability of the receive node for processing the received data packet is indicated to the transmit node by at least one of the following parameters:

a data packet receiving rate of a data receiving queue of the receive node, wherein the data receiving queue receives the data packet from a device driver layer;

a packet loss state of the data receiving queue of the receive node;

a processing rate of the application deployed on the receive node; or space occupation of a processing queue of the application deployed on the receive node.

20. The transmit node of claim 18, wherein the processor is further configured to execute the instructions to cause the transmit node to:

adjust, based on the capability, the target sending rate to obtain an adjusted target sending rate; and further adjust, based on the adjusted target sending rate and current space occupation of the data sending queue, the sending rate.

* * * * *